United States Patent [19]
Ichinose

[11] Patent Number: 5,768,448
[45] Date of Patent: Jun. 16, 1998

[54] IMAGE READER WITH OPTIONAL AUTOMATIC DOCUMENT FEEDER

[75] Inventor: Hayato Ichinose, Yamanasi-ken, Japan

[73] Assignee: Nisca Corporation, Yamanashi-Ken, Japan

[21] Appl. No.: 517,334

[22] Filed: Aug. 21, 1995

[30] Foreign Application Priority Data

| Aug. 20, 1994 | [JP] | Japan | 6-218123 |
| Aug. 20, 1994 | [JP] | Japan | 6-218124 |
| Aug. 20, 1994 | [JP] | Japan | 6-218126 |

[51] Int. Cl.$^6$ ............................. G06K 9/20; G06K 7/00
[52] U.S. Cl. ....................... 382/312; 358/496; 399/110
[58] Field of Search ..................... 382/312, 317, 382/321, 323; 358/400, 474, 494, 496, 498; 399/110, 365, 370, 371; 271/3.15, 3.17; 355/200, 230; 250/208.1, 208.2, 208.4, 214 R, 214.1, 221, 222.1

[56] References Cited

U.S. PATENT DOCUMENTS

| 3,824,546 | 7/1974 | Kawasaki et al. | 382/323 |
| 5,311,004 | 5/1994 | Kusaka | 250/201.8 |
| 5,323,219 | 6/1994 | Hamanaka et al. | 399/371 |
| 5,436,715 | 7/1995 | Yamada et al. | 355/320 |
| 5,555,349 | 9/1996 | Miyasaka et al. | 358/498 |

FOREIGN PATENT DOCUMENTS

| 4-264876 | 9/1992 | Japan | H04N 1/10 |

OTHER PUBLICATIONS

Japanese Patent Laid-Open Publiction HEI 04-264876, published Sep. 21, 1992.

*Primary Examiner*—Joseph Mancuso
*Assistant Examiner*—Timothy M. Johnson
*Attorney, Agent, or Firm*—Kane, Dalsimer, Sullivan, Kurucz, Levy, Eisele and Richard, LLP

[57] ABSTRACT

An image reader is provided with a reader body, an optional unit optionally and detachably attached to the reader body, an image sensor including a light receiving area on which a light is received, the light receiving area having a first light receiving area portion on which a light reflected on the original is received and a second light receiving area portion, the second light receiving area portion being arranged on the remaining portion of the light receiving area other than the first light receiving area portion, and control unit connected to the image sensor, for reading the image impression based on the detected result from the first light receiving area portion and for detecting the attachment of the optional unit to the reader body based on the detected result from the second light receiving area portion.

26 Claims, 12 Drawing Sheets

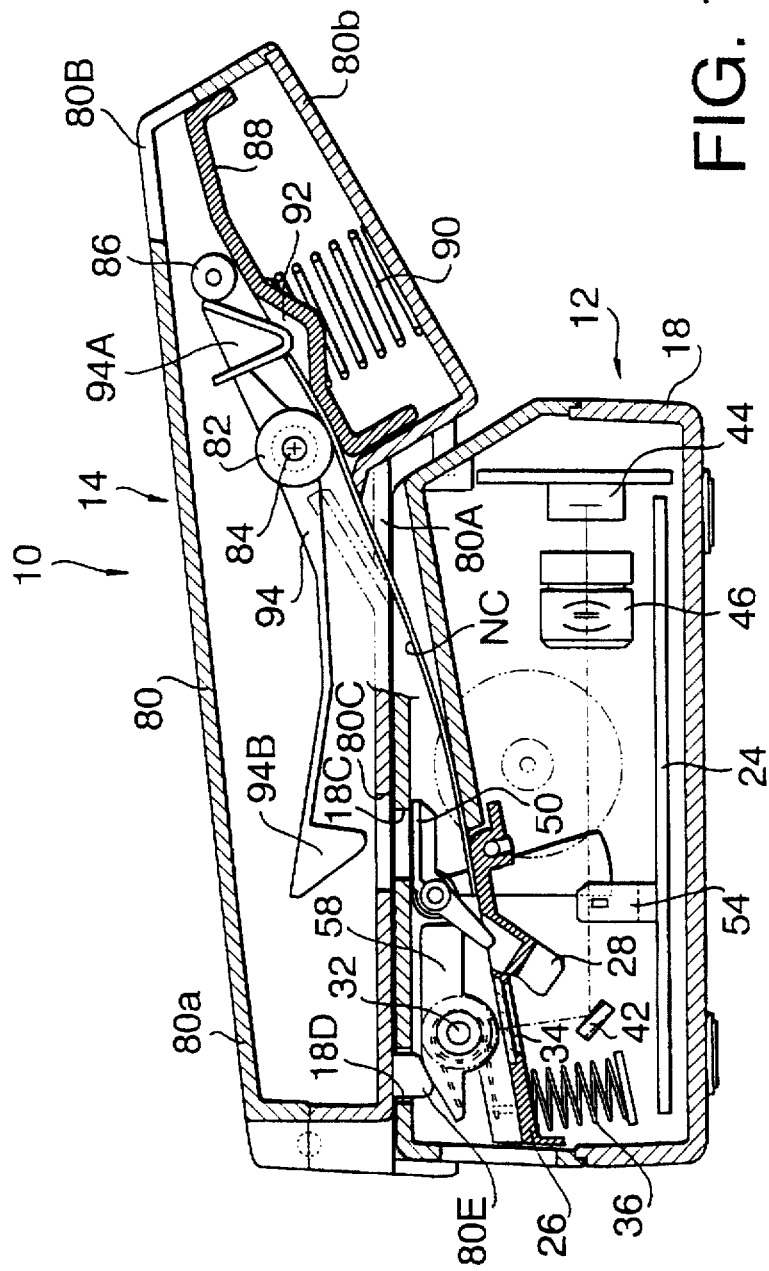

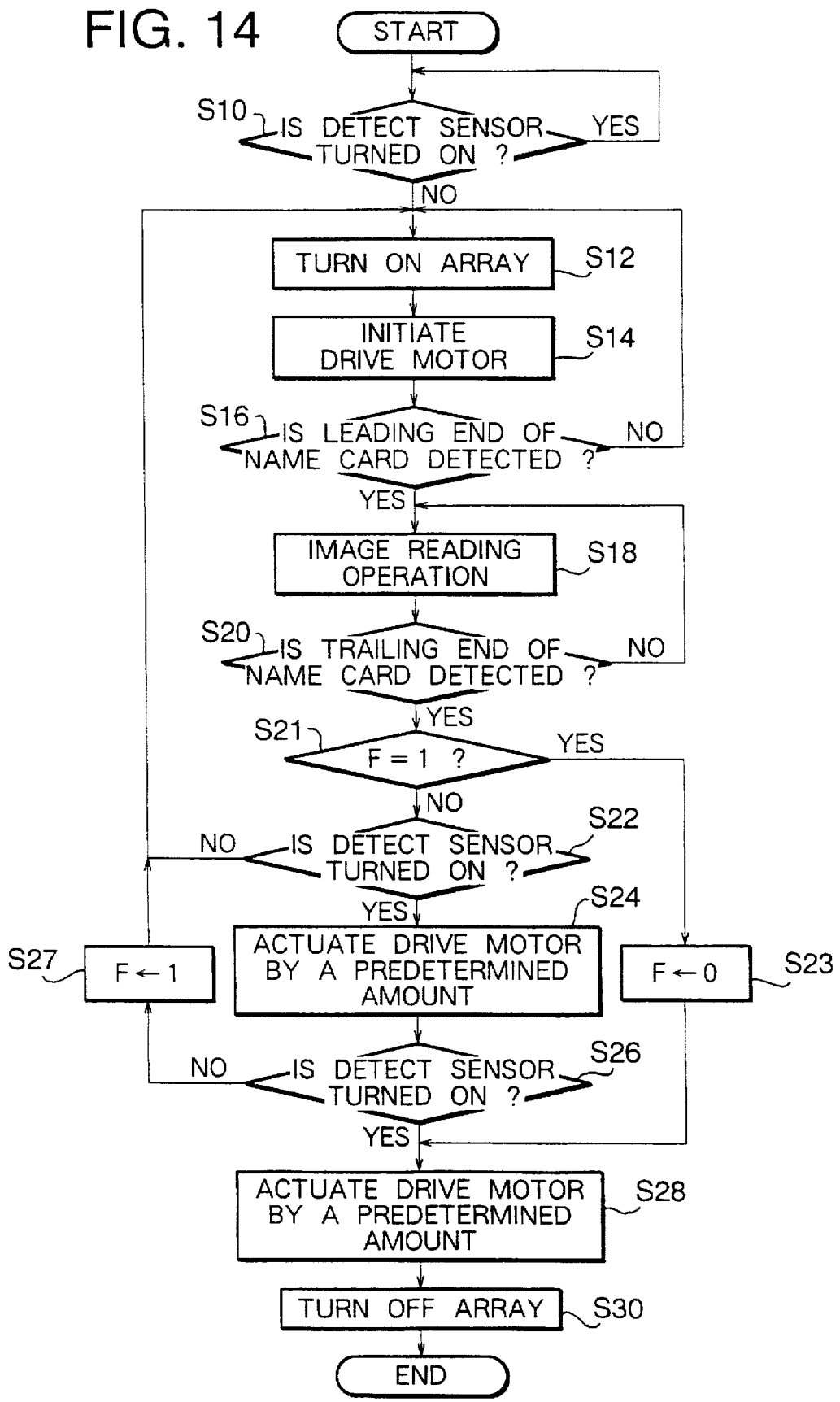

IMAGE READER WITH OPTIONAL AUTOMATIC DOCUMENT FEEDER

BACKGROUND OF THE INVENTION AND RELATED ART STATEMENT

The present invention relates to an image reader in which an image impression formed on an original or document is automatically read, more specifically, it relates to an image reader to which an automatic document feeder is optionally attached.

In a conventional image reader, an automatic document feeder for automatically feeding documents one by one to a reader body is optionally attached to the reader body. In the reader body, an original which is automatically fed by the automatic document feeder is illuminated by a light source, the light reflected on the original is received on an image sensor, and the image impression of the original is read based on the detected signal from the image sensor. An image reader which includes a reader body and an automatic document feeder is disclosed in, for example, a Japanese Patent Laid-open Publication No. HEI 04-264876 published on Sep. 21, 1992.

In the conventional image reader thus disclosed, the attachment of the automatic document feeder to the reader body is detected by using the image sensor. More specifically, the light source is set to be moved reciprocately. When the image sensor detects an attachment inform member which is fixed to a housing of the feeder at an appropriate time the light source is moved to a predetermined position without the image reading area for the original, a control unit determines that the feeder has been attached to the reader body, while when the image sensor does not detect the attachment inform member at the timing, the control unit determines that the feeder has not been attached to the reader body.

In the conventional image reader, however, it is necessary to move the light source to the predetermined position in order to detect the attachment of the feeder to the reader body. Accordingly, the conventional image reader is troublesome in operation.

SUMMARY OF THE INVENTION

The present invention, therefore, has as its principal object to provide an image reader which can easily detect the attachment of an automatic document feeder to a reader body.

In order to attain the above-mentioned object, according to a first aspect of the present invention, there is provided an image reader which comprises a reader body, an optional unit optionally and detachably attached to the reader body, an image sensor including a light receiving area on which a light is received, said light receiving area having a first light receiving area portion on which a light reflected on the original is received and a second light receiving area portion, said second light receiving area portion being arranged on the remaining portion of said light receiving area other than said first light receiving area portion, and control means connected to said image sensor, for reading said image impression based on the detected result from said first light receiving area portion and for detecting the attachment of the optional unit to said reader body based on the detected result from said second light receiving area portion.

According to a second aspect of the present invention, there is provided an image reader which comprises a reader body having an image reading function for reading an image impression formed on an original, and an automatic original feeder detachably attached to said reader body for automatically feeding the originals to said reader body one by one, said reader body including illumination means for illuminating said original fed by said automatic original feeder, an image sensor including a light receiving area having a first light receiving area portion and second light receiving area portion, for receiving a light, which is illuminated by said illumination means and reflected on said original, on said first light receiving area portion and outputting a detect signal with an image information, an attach detect member movable between an attach detect position where the light illuminated by said illumination means and reflected thereon is set to be received on said second light receiving area portion and a detach detect position where the light illuminated by said illumination means and reflected thereon to outside of said image sensor, and said automatic original feeder includes a feeder housing and an attach information member fixed to said feeder housing, said attach information member moving said attach detect member from the detach detect position to the attach detect position upon the attachment of said automatic original feeder to said reader body.

BRIEF DESCRIPTION OF THE DRAWINGS

These and other objects of the subject invention will become more fully apparent as the following description is read in light of the attached drawings wherein:

FIG. 13 is a vertically sectional view of the name card reader shown in FIG. 2, in a case where the name card with minimum size has been picked up by pick-up rollers and located between a detected piece of a detect lever and a detecting end of a connecting arm; and FIG. 14 is a flow-chart showing a control procedure of a control unit according to one modification of the embodiment.

DETAILED DESCRIPTION OF THE PREFERRED EMBODIMENT

Hereinafter, the detailed description of the preferred embodiment of a name card reader as an image reader according to the present invention will be given with reference to the accompanying drawings.

[Description of the Entire Construction of a Name Card Reader 10]

Figure 1:
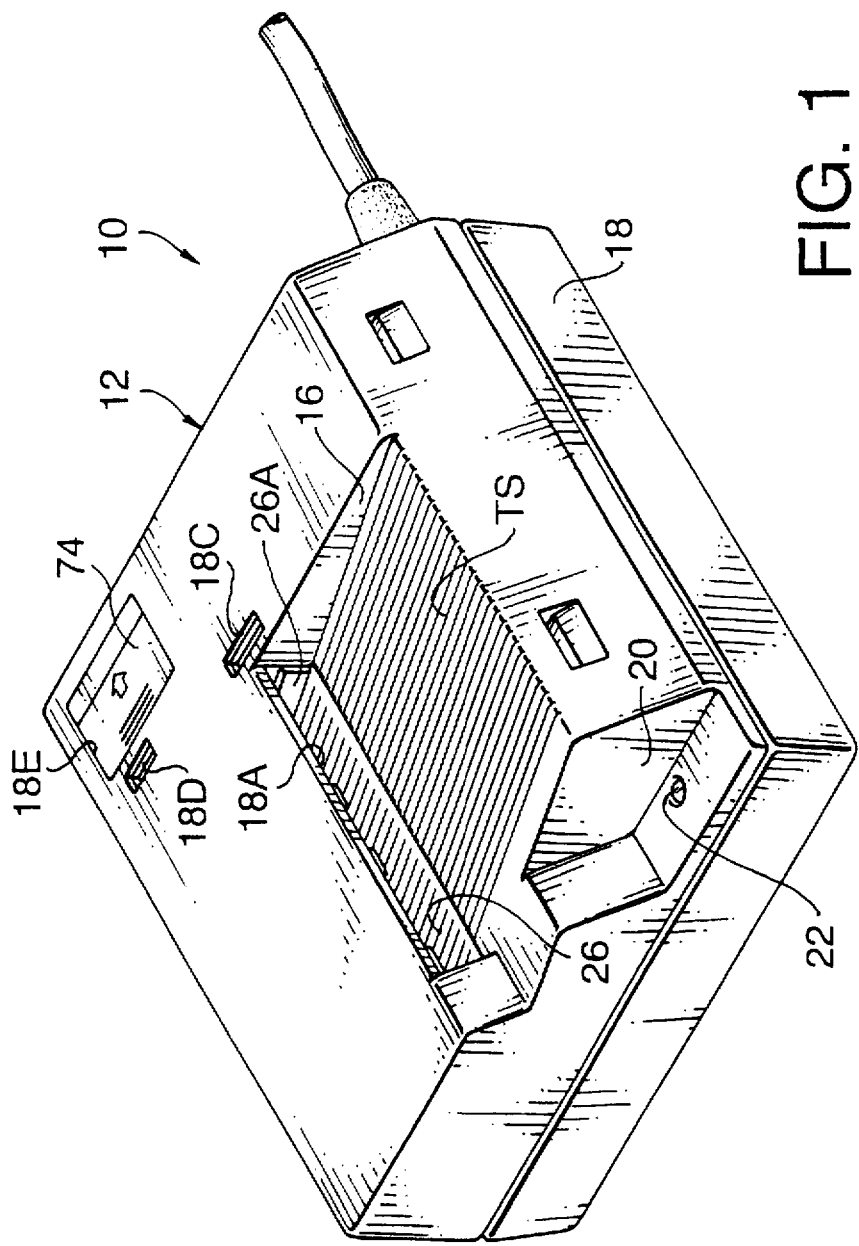
FIG. 1 is a perspective view showing a construction of a name card reader as one embodiment according to the present invention, in a case where the name card reader is comprised of a reader body.
Figure 2:
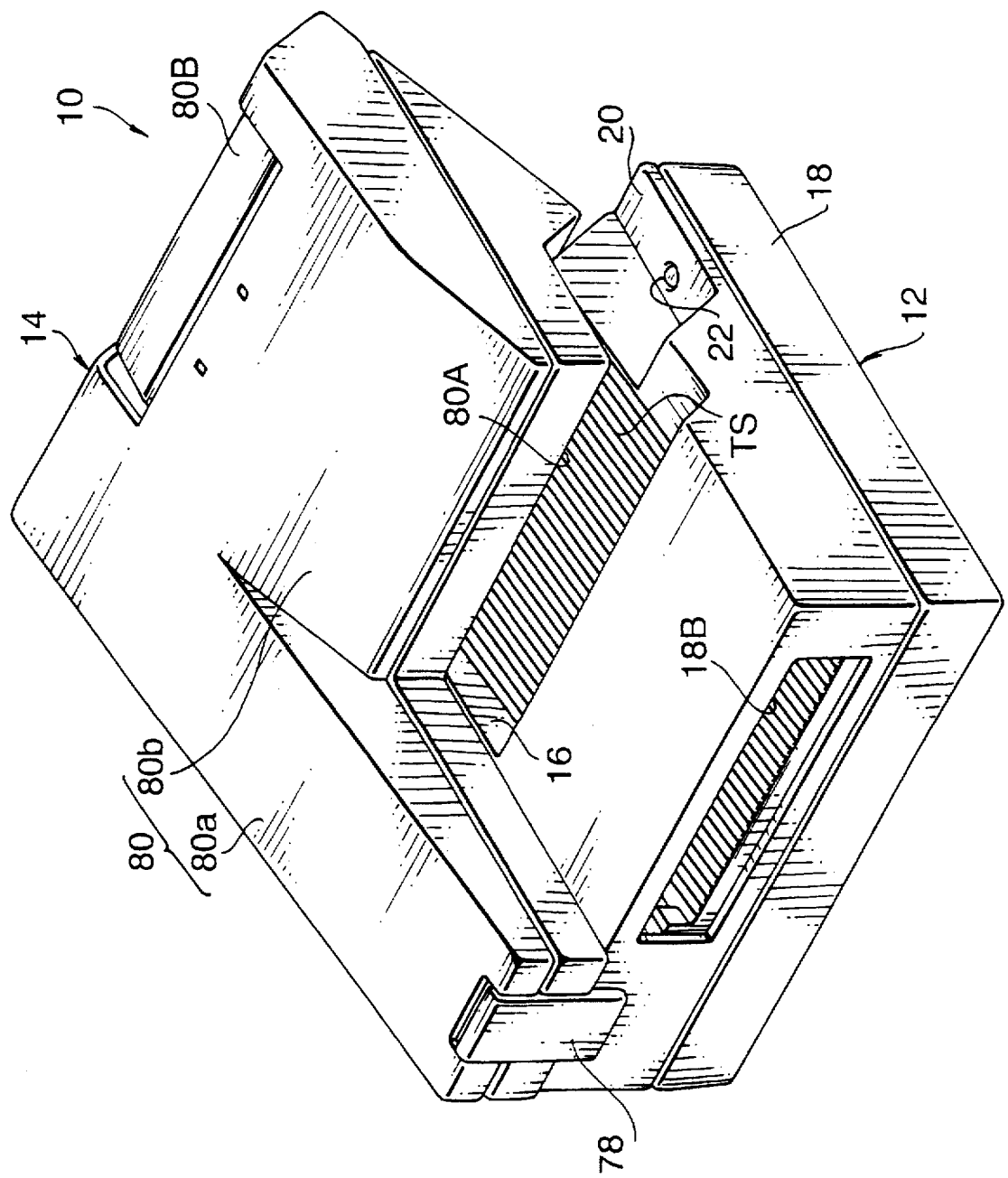
FIG. 2 is a perspective view showing a construction of the name card reader as one embodiment according to the present invention, in a case where the name card reader includes a reader body and an automatic name card feeder attached to the reader body.

As shown in FIG. 1, the name card reader 10 of the preferred embodiment is provided with a reader body 12 for reading an image impression of a name card NC and an automatic name card feeder 14 which is optionally attached to the upper surface of the reader body 12, as shown in FIG. 2. The name card reader 10 is defined as a manual feed type wherein the name cards NC are fed by manually one by one when it is constructed only by the reader body 12, as shown in FIG. 1, while it is defined as an automatic feed type wherein the name cards NC are automatically fed when it is constructed by both of the reader body 12 and the automatic feeder 14 as shown in FIG. 2.

Hereinafter, the name card reader 10 of the manual feed type to which the automatic name card feeder 14 is not attached as shown in FIG. 1 will be described at first and then the name card reader 10 of the automatic feed type to which the automatic name card feeder 14 is attached as shown in FIG. 2 will be described.

[Description of Reader Body 12]

Description of Outer Configuration

Figure 3:
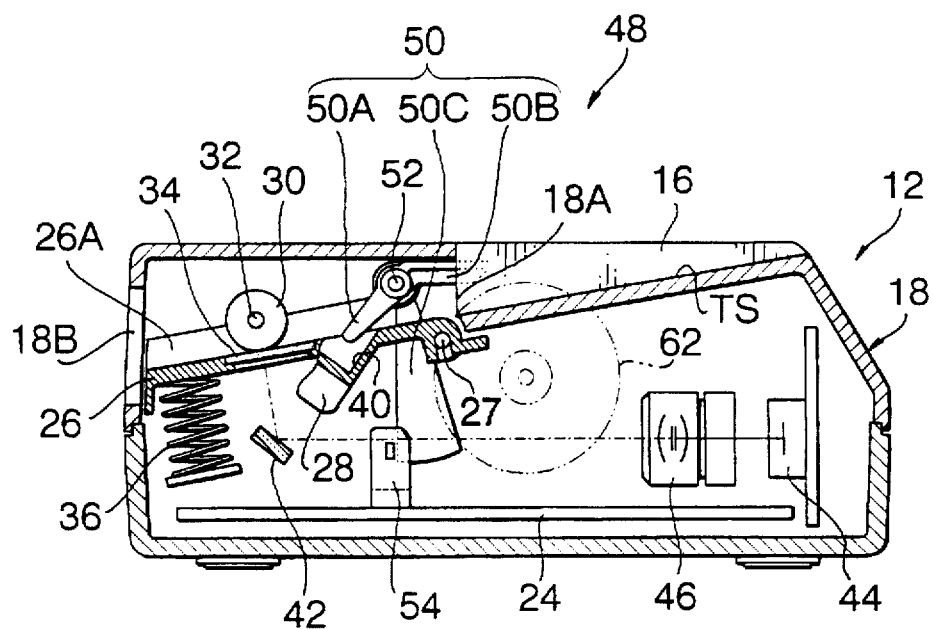
FIG. 3 is a vertical sectional front view of the reader body of the name card reader shown in FIG. 1, showing an internal construction of the reader body, in a case where a name card has not been inserted into a housing.

As shown in FIGS. 1 and 3, the reader body 12 includes a housing 18 which is capable of dividing into upper and lower parts. Formed on the upper surface of the housing 18 is a first recessed portion 16, a bottom surface of which is inclined to a horizontal surface. One end portion of the bottom surface on the downstream side with respect to a feed direction X of name card NC is set to be lower relative to the other end thereof on the upstream side with respect to the feed direction X. Note that the inclined bottom surface of the recessed portion 16 defines a guide path GP for the name card NC along which the name card NC is fed in the feed direction X.

One side surface of the first recessed portion 16 located on the downstream side with respect to the feed direction X is fully opened and this opening defines a take-in port 18A through which the name card NC is taken into the housing 18. As shown in FIG. 3, a discharge port 18B, through which the name card NC after the image of the name card NC has been read is taken out from the housing 18, is formed on the other side surface of the housing 18 which is opposed to the take-in port 18a.

A second recessed portion 20 is formed at a corner of the first recessed portion 16. A display lamp 22 is arranged on the bottom surface of the second recessed portion 20. The lamp 22 is directly connected to a control unit provided to a control circuit board 24 which is arranged to a bottom in the housing 18 and set to inform a power-on condition whereby the lamp 22 is continuously turned on, while inform an image reading condition whereby the lamp 22 goes on and off repeatedly.

Description of Guide Member 26

As shown in FIG. 3, a guide member 26 on which the name card NC is guided to be fed in the feed direction X is arranged in the housing 18 in such a manner that it is set to be substantially flush with the guide path GP. The guide member 26 is swingably supported to a support shaft 27 at a rear end thereof (that is, an end thereof on the upstream side with respect to the feed direction X). An array of light emitting devices 28 which will be described in detail is fixed to the under surface of the guide member 26. An upright guide piece 26A integrally stands on each side edge of the guide member 26 which extends in the feed direction X, for guiding and restricting each side edge of the name card NC to be fed in the feed direction X during the feeding operation.

A pair of feed rollers 30 are arranged in the housing 18 in such a manner that they are located on the guide member 26 and coaxially fixed to a support shaft 32 which is rotatably supported to the housing 18 around an axis perpendicular to the feed direction X. A portion of the guide member 26 which opposes to the feed rollers 30 has an opening which is covered by a transparent plate 34 such as a transparent glass.

A part of the guide member 26 on the downstream side with respect to the feed direction X is urged upward by a coil spring 36 to swing clockwise about the support shaft 32. Thus, the transparent plate 34 is pressingly contacted to the feed rollers 30 from below by the urging force of the coil spring 36. As a result, the name card NC which has been inserted to nip portions between the transparent plate 34 and the feed rollers 30 is fed in the feed direction X (that is, to the left in the figure) upon the rotation of the feed rollers 30 through a drive mechanism 38 which will described later.

Description of Light Illumination System

A recess 40 with an inverted triangular shape in the front view is formed to a portion of the guide member 26 which is located on the upstream side of the transparent plate 34 with respect to the feed direction X. Namely, the undersurface of a portion of the guide member 26 corresponding to the triangular recess 40 is protruded downward in a form of the inverted triangular shape. The array of the light emitting devices 28 are fixed to the protruded portion of the undersurface of the guide member 26 in such manner that it can illuminate the undersurface of the name card NC (that is, the image formed surface of the name card NC) which is clamped between the feed rollers 30 and transparent plate 34, through the transparent plate 34 in all over a width direction (that is, a direction perpendicular to the feed direction X). The array 28 is constructed by a multiple of light emitting devices (LEDs) which are arranged in a series. The attaching angle of the array 28 to the guide member 26 is set in such a manner that an optical axis of the array 28 is directed to the nip portions between the feed rollers 30 and transparent plate 34 in a condition where the name card NC has not been fed on the transparent plate 34.

Accordingly, the light emitted from the array 28 which is fixed to the undersurface of the guide member 26 is reflected on the undersurface (that is, the image formed surface) of the name card NC at an image reading position in a condition where the name card NC has been fed to the nip portion. The image reading position of the name card NC is defined by a portion of the undersurface of the name card NC which is clamped between the feed rollers 30 and the transparent plate 34.

As a result, even though the name card NC has been inserted through the take-in port 18A and clamped between the feed rollers 30 and the guide member 26 (namely, the transparent plate 34) and whereby the guide member 26 is swung counterclockwise about the support shaft 27 against the urging force of the coil spring 36, a distance between the array 28 and the image reading position is not altered or changed but maintained to a predetermined constant value.

Figure 4:
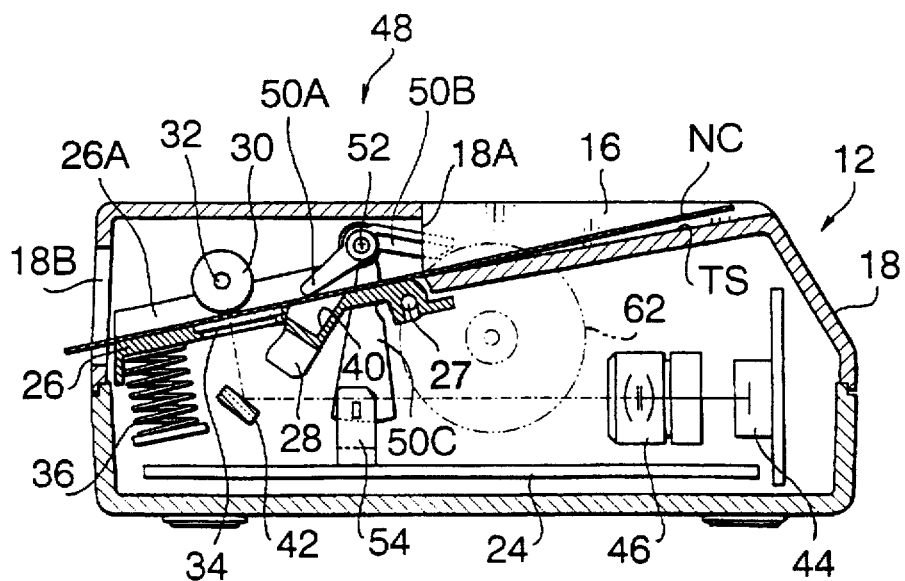
FIG. 4 is a vertical sectional front view of the reader body of the name card reader shown in FIG. 1, showing the internal construction of the reader body, in a case where a name card has inserted into the housing.

As described above in detail, the undersurface (that is, the image formed surface) of the name card NC which has been fed to the nip portion between the feed rollers 30 and the transparent member 26 is illuminated by the array 28 at a timing when the leading end of the name card NC has reached to the transparent plate 34, as shown in FIG. 4. Especially, a luminous energy on the undersurface (that is, the image formed surface) of the name card NC by the light from the array 28 is maintained to a constant value since the distance between the array 28 and the image reading position is set to be constant even though the guide member 26 has been swung. Accordingly, the luminous energy on the undersurface of the name card NC by the light from the array 28 is maintained to a constant value even though the thickness of the name card NC has been altered.

As a result, a luminous energy on an image sensor 44, which will be described later, by the reflected light from the imaged formed surface of the name card NC is also maintained to a constant value even though the thickness of the name card NC has been altered, whereby the deterioration of an image reading function of the image sensor 44 due to the alteration of the luminous energy on the image sensor 44 is certainly and effectively prevented.

Description of Light Receiving System

As shown in FIG. 3, a light reflecting mirror 42 is arranged in the housing 18 in such a manner that it is disposed just below the transparent plate 34, and is provided for reflecting the light, which is reflected on the image formed surface of the name card NC, to the image sensor 44. The mirror 42 is fixed to the housing 18 through an attaching stay (not shown), in this embodiment. The image sensor 44 is located in a position where the light reflected on the mirror 42 is received thereon, and fixed to the housing 18 though an attaching stay (not shown) in this embodiment. The image sensor 44 is constructed by a well-known charge coupling device (CCD), in this embodiment.

Figure 5A:
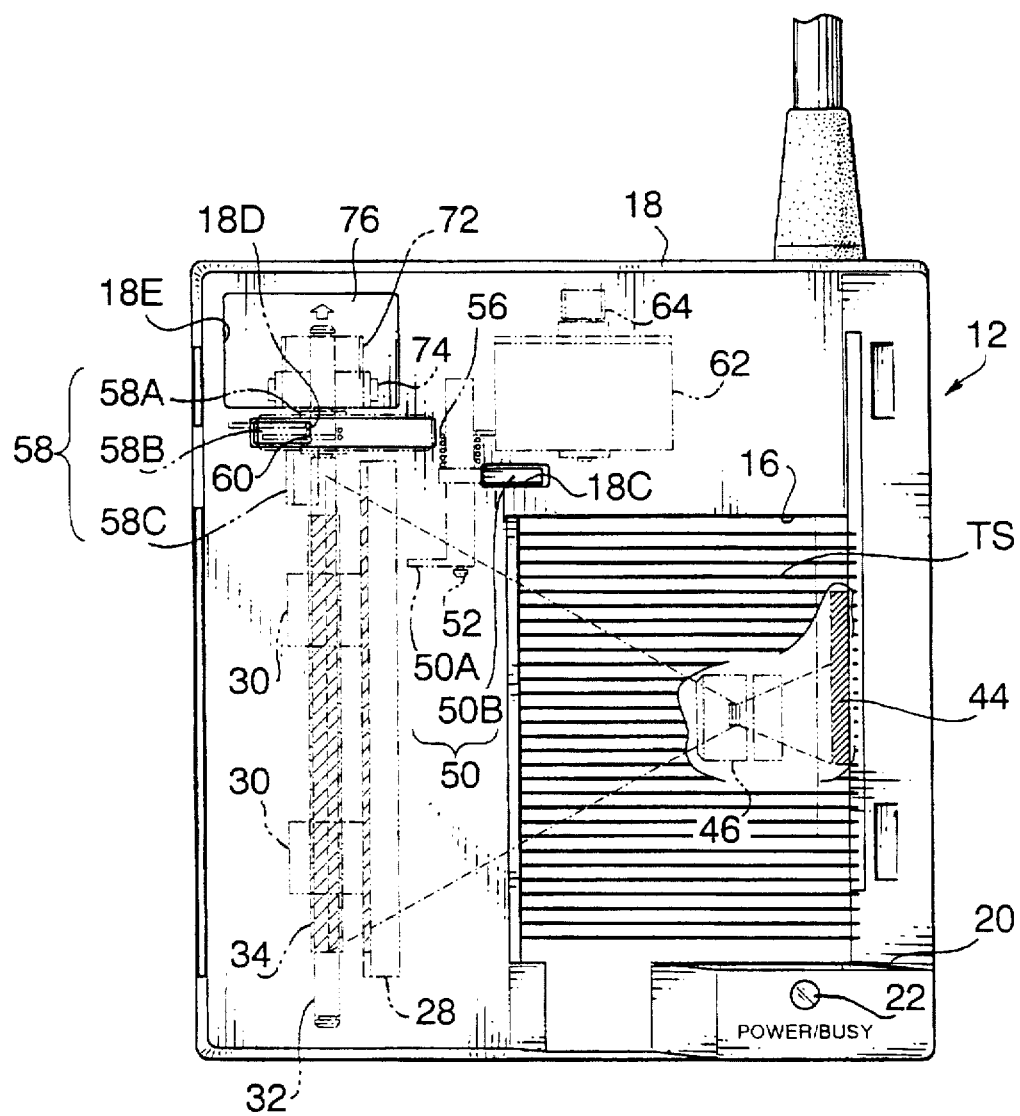
FIG. 5A is a plan view of the reader body for substantially showing the internal construction thereof.
Figure 5B:
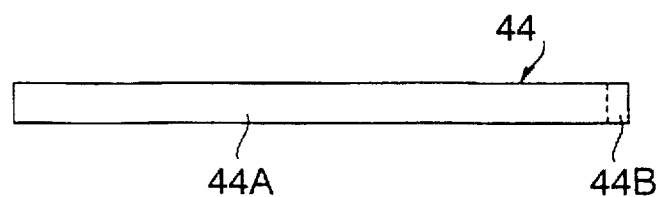
FIG. 5B is a front view of a light receiving area of an image sensor.

As shown in FIG. 5B, the image sensor 44 includes a light receiving area which is composed of a first light receiving area portion 44A and a second light receiving area portion 44B which is exclusive to the first light receiving area portion 44A. More specifically, the second light receiving area portion 44B is defined by one end portion of the light receiving area and the first light receiving area portion 44a is defined by the remaining portion of the light receiving area. The firs light receiving area portion 44A is provided for reading the image impression of the image formed surface of the name card NC while the second light receiving area portion 44B is provided for detecting the attachment of the automatic name card feeder 14.

As shown in FIGS. 3 and 5A, a focus lens 46 is arranged between the reflecting mirror 42 and the image sensor 44 in a optical path of the light reflected on the image formed surface of the name card NC. The focus lens 46 is provided for focusing the reflected light onto the light receiving area of the image sensor 44 with a predetermined focal depth. Since the focus lens 46 is constructed to have the predetermined depth of field, the reflected light from the image formed surface of the name card NC is substantially focused onto the light receiving area of the image sensor 44, even though a length of the optical path between the image formed surface of the name card NC and the image receiving area of the image sensor 44 is changed according to the alteration of the thickness of the name card NC. Accordingly, the deterioration of the image reading function of the image sensor 4 due to the alteration of the focal point is certainly and effectively prevented.

Description of Name Card Detecting Mechanism
48

As shown in FIG. 3, a name card detecting mechanism 48 for detecting that the name card NC has been inserted into the housing 18 is arranged in the housing 18 in such a manner that it is located on the upstream side of the feed rollers 30 with respect to the feed direction X. The name card detecting mechanism 48 is provided with a detecting lever 50 which is rotatably supported to a support shaft 52 with a rotating axis parallel to the rotating axis of the feed roller 30, and a detect sensor 54 which is provided for detecting the insertion of the name card NC into the housing 18.

The detecting lever 50 integrally includes a detected piece 50A which is capable of dropping into the recess 40 as described above, a cover piece 50B which is capable of covering or closing a first opening 18C formed to the upper surface of the housing 18 from below, said first opening 18C being formed to the upper surface of the housing 18 as shown in FIG. 1, and an actuate piece 50C which is capable of turning on the detect sensor 54 connected directly to the control circuit board 24.

The detect sensor 54 is constructed by a well-known photo-interrupter including a light emitting device (LED) and a photo-transistor in this embodiment and set to output a detect signal upon the rotation of the detecting lever 50 from a non-detecting position where the light from the LED is allowed to be received on the photo-transistor to a detecting position where the light from the LED is prevented from being received on the photo-transistor. That is, the detect sensor 54 is turned on and does not output the detect signal when the actuate piece 50C of the detecting lever 50 is rotated into the non-detecting position of the detect sensor 54, as shown in FIG. 3, while it is turned off and outputs the detect signal when the actuate piece 50C is rotated into the detecting position, as shown in FIG. 4.

The detecting lever 50 is urged to rotate in counterclockwise by an urging force of a torsion coil spring 56 as shown in FIG. 5A. Accordingly, the detect piece 50A of the detecting lever 50 is dropped into the recess 40 by the urging force of the torsion coil spring 56 in a condition where the name card NC has not been fed in the housing 18, as shown in FIG. 3. In this condition, the cover piece 50B of the detecting lever 50 closes the first opening 18C from below as well as the actuate piece 50C thereof is rotated in the non-detecting position of the detect sensor 54 thereby causing the detect sensor 54 to be turned on. Since the detect sensor 54 is turned on and does not output the detect signal to the control unit arranged on the control circuit board 24, the control unit determines that the name card NC has not been fed or inserted into the housing 18 and controls to stop the drive of the drive mechanism 38 and the image reading operation based on the detected signals output from the image sensor 44.

Where the detect sensor 54 is turned on, in other words, it is determined that the name card NC does not been existed on the guide member 26 as shown in FIG. 3, the first opening 18C of the housing 18 is closed by the cover piece 50B of the detecting lever 50. As a result, the inside of the housing 18 would be effectively prevented from being deteriorated by the dust or dirt through the first opening 18C.

On the other hand, when the name card NC has once been inserted through the take-in port 18A, the detected piece 50A of the detecting lever 50 is pushed up by the upper surface of the name card NC and accordingly, the detecting lever 50 is rotated clockwise against the urging force of the torsion coil spring while the cover piece 50 thereof allows to open the first opening 18C of the housing 18 as well as the actuate piece 50C thereof causes the detect sensor 54 to be turned off. When the detect sensor 54 is turned off, the detect signal is output to the control unit and accordingly, the control unit determines that the name card NC has been inserted into the housing 18 upon the input of the detect signal thereto and controls to drive the drive mechanism 38 and start the image reading operation based on the detected signals output from the image sensor 44.

Description of Attach Detecting Member 58

Figure 6:
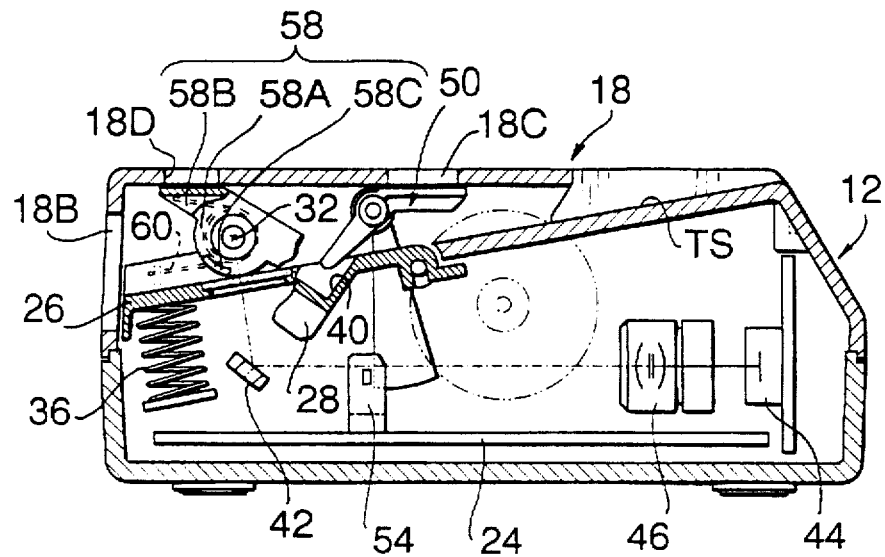
FIG. 6 is a longitudinally sectional view of the reader body at a different sectional position from that shown in FIG. 3.

As shown in FIGS. 5A and 6, an attach detecting member 58 for detecting that the automatic name card feeder 14 is attached to the reader body 12 rotatably supported to the support shaft 32 to which the feed rollers 30 are coaxially fixed. The attach detecting member 58 is integrally provided with a substantially cylindrical main body 58A which is rotatably inserted into the support shaft 32, a cover piece 58B which capable of covering or closing a second opening 18D formed to the upper surface of the housing 18 from below, and an actuate piece 58C which is attached to the bottom of the main body 58A, extends to approach the end of the transparent plate 34 in the axial direction of the support shaft 32 and is capable of reflecting the light from the array 28 to the mirror 42.

The attach detecting member 58 is urged to rotate clockwise by a torsion coil spring 60 as shown in FIG. 6. As a result, where the automatic name card feeder 14 has not yet attached to the reader body 12, the cover piece 58B of the attach detecting member 58 covers the second opening 18D from below as well as the actuate piece 58C is rotated to a rotational position (that is, non-attach detecting position) where the light from the array 28 is not reflected to the mirror 42. Namely, the illumination area of the array 28 is set to cover the reading area for the name card NC as well as the distal end portion of the transparent plate 34 through the transparent plate 34.

Note that the actuate piece 58C of the attach detecting member 58 is set to reflect the light from the array 28 to the mirror 42 upon the rotation from the non-attach detecting position to a attach detecting position by the automatic name card feeder 18, which has been attached to the reader body 12, against the urging force of the torsion coil spring 60.

Figure 9:
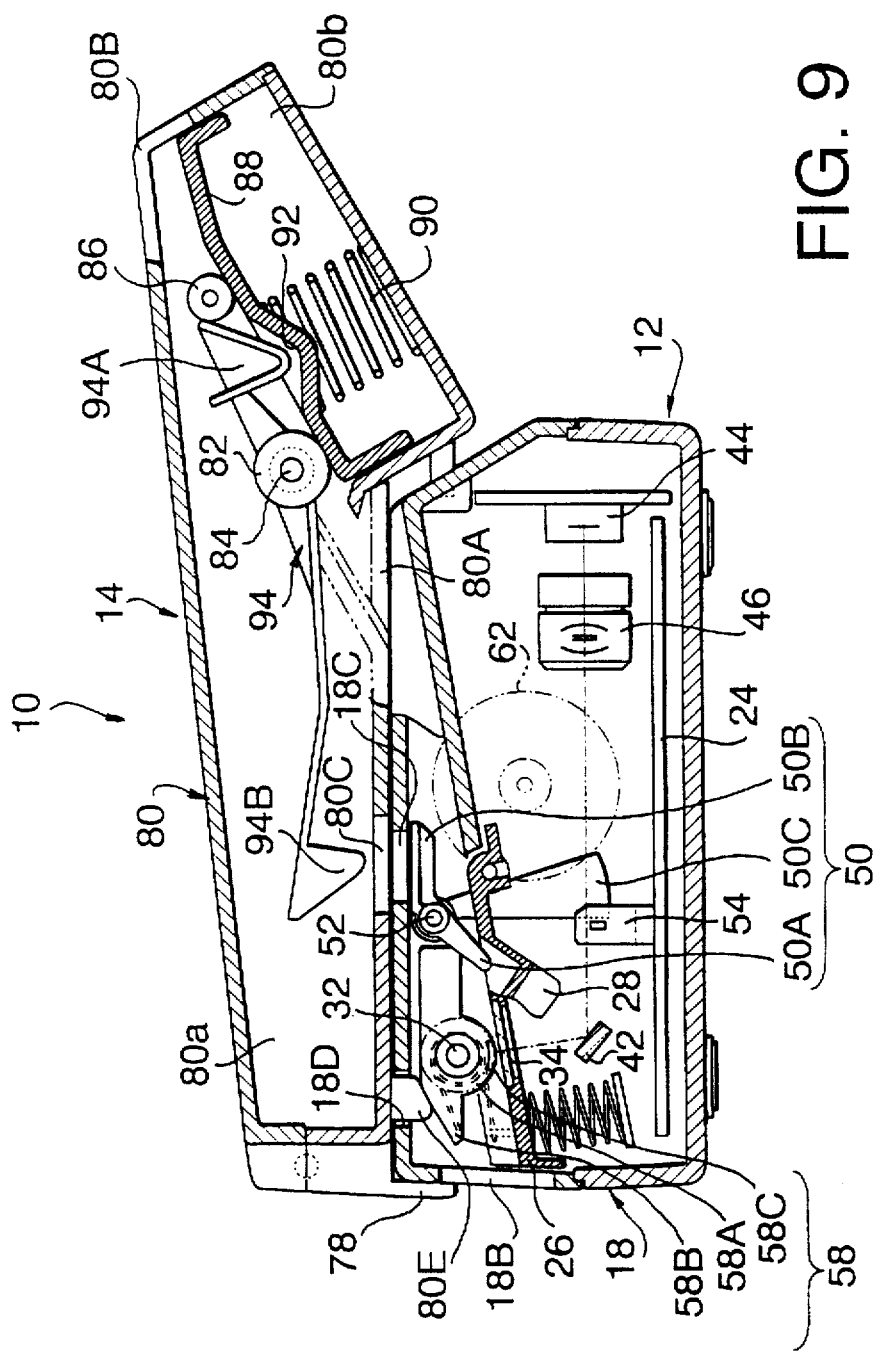
FIG. 9 is a vertically sectional view of the name card reader shown in FIG. 2, showing an internal construction of the reader body and the automatic name card feeder, in a case where no name card has been set in the automatic name card feeder.

As a result, where the automatic name card feeder 14 has not yet attached to the reader body 12 as shown in FIG. 6, the light which is reflected on the actuate piece 58C of the attach detecting member 58 is not reflected on the mirror 42, and accordingly, is not received on the image sensor 44. On the other hand, where the automatic name card feeder 14 is attached to the reader body as shown in FIG. 9, the light which is reflected on the actuate piece 58C is reflected on the mirror 42, and therefore received on the second light receiving area portion of the image sensor 44.

The control unit is constructed in such a manner that it uses the detected signal from the first light receiving area portion 44A of the image sensor 44 as an image signal while it uses the detected signals from the second light receiving area portion 44B as an attach detect signal. Accordingly, the control unit determines that the automatic name card feeder 14 has not yet attached to the reader body 12 when the attach detect signal has not input thereto while the automatic name card feeder 14 is attached to the reader body 12 when the attach detect signal is input thereto.

Where the automatic name card feeder 14 has not attached to the reader body 12, the second opening 18D of the housing 18 is covered or closed by the cover piece 58B of the attach detecting member 58. As a result, the inside of the housing 18 would be effectively prevented from being deteriorated by the dust or dirt through the second opening 18D.

Description of Drive Mechanism 38

Figure 7:
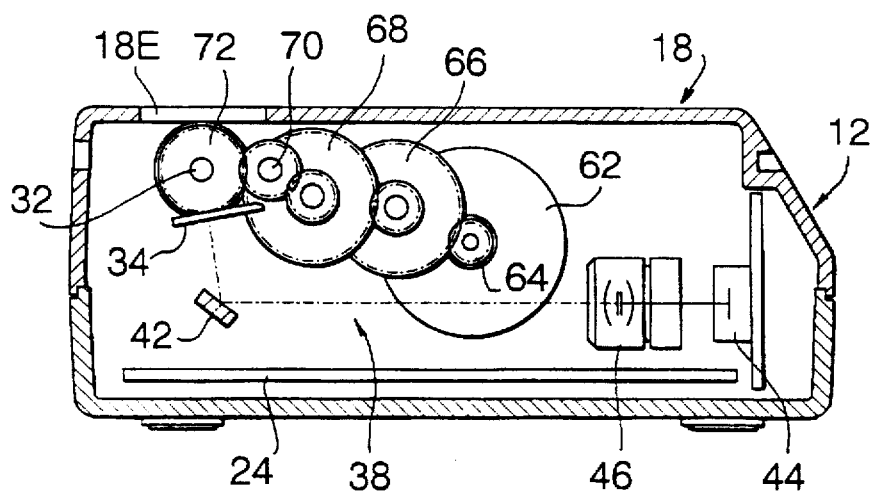
FIG. 7 is a vertical sectional front view of the reader body for showing a construction of a drive mechanism.
Figure 8:
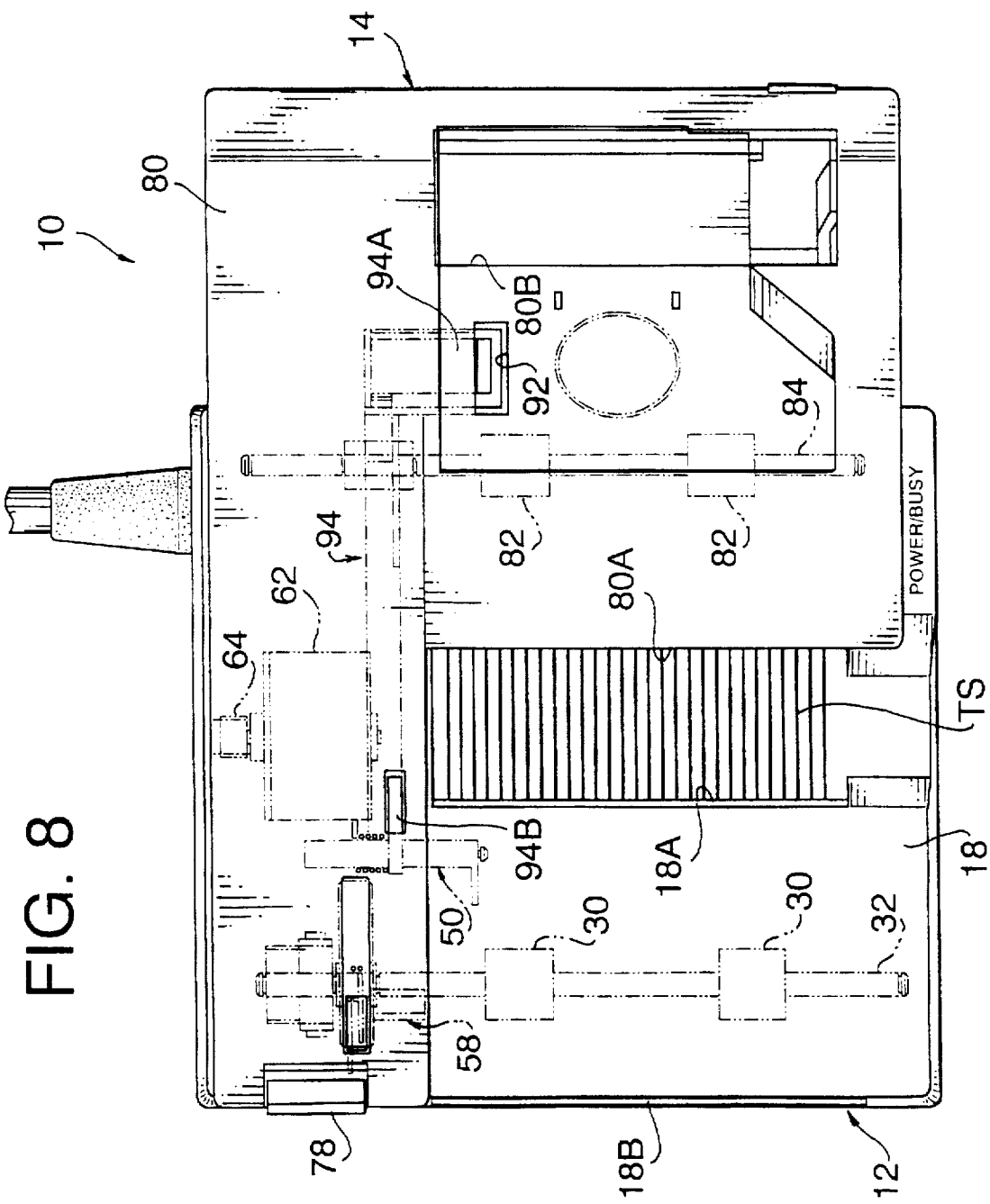
FIG. 8 is a plan view of the name card reader in a case where the automatic name card feeder is attached to the reader body.

With reference to FIG. 7, the construction of the drive mechanism 38 for feeding the name card NC which has been manually inserted into the housing 18 through the take-in port 18A or which has been fed into the housing 18 by the automatic name card feeder 14.

As shown in FIG. 7, the drive mechanism 38 is contained in the housing 18 on one side portion and includes a drive motor 62, a motor shaft of which is driven to rotate in one direction (in a clockwise direction in this embodiment). The motor shaft of the drive motor 62 is set to extend to the one side portion in the housing 18. Coaxially fixed to the distal end portion of the motor shaft of the drive motor 62 is a drive gear 64. Meshed with the drive gear 64 is a large diameter gear portion of a first reduction gear 66 with a predetermined first reduction ratio.

Further meshed with a small diameter gear portion of the first reduction gear 66 is a large diameter gear portion of a second reduction gear 68 with a predetermined second reduction ratio. Still further meshed with a small diameter gear portion of the second reduction gear 68 is a driven gear 72 through an idle gear 70, the driven gear 72 is coaxially fixed to an end of the support shaft 32 to which the feed rollers 30 are coaxially fixed. Thus, when the drive motor 62 is driven to rotate the motor shaft clockwise, the feed rollers 30 coaxially fixed to the support shaft 32 are simultaneously rotated clockwise.

As shown in FIG. 5A, a transmission gear 74 for transmitting the drive force of the drive motor 62 to the automatic name card feeder 14 when attached is coaxially fixed to the support shaft 32 in a condition where it is arranged near the driven gear 72. A third opening 18E is formed to the upper surface of the housing 18 in a portion which is located just above the transmission gear 74. The third opening 18E is covered by a cover member 76 where the automatic name card feeder 14 is not attached to the reader body 12. The cover member 76 is slidable in the third opening 18E between an open position for allowing to access to the transmission gear 74 and a close position for closing the third opening 18E. The cover member 76 is set to be clicked in the close position by a click mechanism (not shown).

[Brief Description of Operation of Name Card Reader 10]

Since the name card reader 10 of the present embodiment is constructed as described above in detail, when a power switch (not shown) is turned on, the control unit determines that the name card NC has not been inserted or fed along the guide path GP in a condition where the detect sensor 54 of the detect mechanism 48 is turned on, as shown in FIG. 3. Accordingly, the control unit controls to switch off the array 28 of the LEDs as well as to stop the drive motor 64 of the drive mechanism 38, thereby determining an stand-by condition for reading the name card NC.

On the other hand, when the name card NC is inserted into the housing 18 manually or fed into the housing 18 by the automatic name card feeder 14 and the leading end of the name card NC has reached to the nip portion between the feed rollers 30 and the transparent plate 34, the detecting lever 50 is rotated clockwise against the torsion coil spring by pushed up by the upper surface of the name card NC.

When the detect sensor 54 of the detect mechanism 48 is turned off whereby the detecting lever 50 is rotated clockwise, it outputs the detect signal to the control unit and which determines that the name card NC is inserted into the housing 18 manually or fed into the housing 18 by the automatic name card feeder 14 along the guide path GP. Accordingly the control unit controls to switch on the array 28 of the LEDs as well as to drive the drive motor 64 of the drive mechanism 38, thereby rotating the feed rollers 30.

As a result, the name card NC, the leading end of which is abut against the nip portion between the feed rollers 30 and the transparent plate 34, is conveyed on the transparent plate 34 upon the rotation of the feed rollers 30, as shown in FIG. 4. Consequently, the name card NC is illuminated by the array 28 of the LEDs while the image read surface defined by the under surface of the name card NC is passing over the transparent plate 34. The light which is emitted from the array 28 of the LEDs and reflected on the image read surface is conducted onto the image sensor 44 and the control unit detects the image impression of the name card NC.

[Description of Automatic Name Card Feeder 14]

Next, the description will be given to the construction of the automatic name card feeder 14 which is optionally attached to the reader body 12 in detail, with reference to FIGS. 8 through 14.

Description of Feeder Housing 80

As shown in FIG. 2, the automatic name card feeder 14 is set to be attached to and disposed on the upper surface of the reader body 12 and includes a feeder housing 80 which is locked to the housing 18 of the reader body 12 through a lock member 78. As shown in FIGS. 2 and 9, the feeder housing 80 integrally includes a connecting portion 80a which is disposed just above the one side portion of the housing 18 of the reader body 12, and a name card receiving portion 80b which is disposed just above the guide path GP if the housing 18.

As shown in FIG. 9, the name card receiving portion 80b has an take-out port 80A on the under surface thereof, facing to the guide path GP. A name card set port 80B is formed to a corner of the feeder housing 80 in such a manner that the name card set port 80B is opposed to the name card take-out port 80A.

Description of Pick-up Rollers 82

Figure 10:
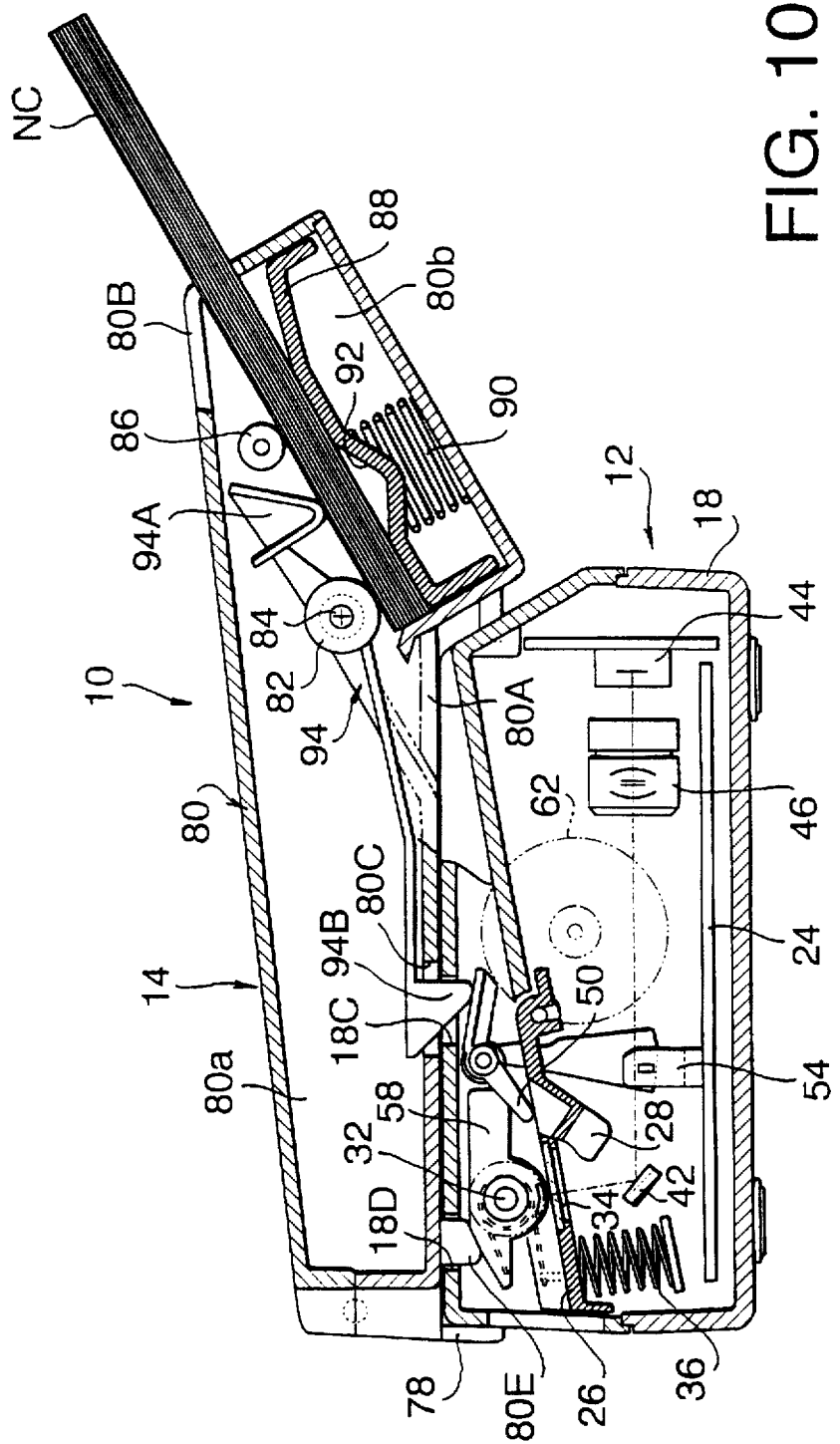
FIG. 10 is a vertically sectional view of the name card reader shown in FIG. 2, showing the internal construction of the reader body and the automatic name card feeder, in a case where a plurality of name cards have been set in the automatic name card feeder.

As shown in FIG. 10, pick-up rollers 82 are arranged in the name card receiving portion 80b of the feeder housing 80 and provided for picking up the name cards NC one by one which are set to the name card receiving portion 80b through the name card set port 80B and feed it to the take-in port 18A of the housing 18 of the reader body 12. The pick-up rollers 82 are coaxially fixed to a support shaft 84 which is arranged in the feeder housing 80 so as to rotatable about an axis substantially parallel to the support shaft 32.

In the feeder housing 80, press rollers 86 are arranged on an upstream side of the pick-up rollers 82 with respect to a feed direction of the name card NC (that is, on the name card set port 80B side) and rotatably supported. An imaginary plane connecting the rotating axis of the pick-up rollers 82 and the rotating axis of the press rollers 86 is set to intersect to the guide path GP with a predetermined obtuse angle. As a result, the name card NC which has been fed by the automatic name card feeder 14 comes to be abut against the guide path GP and then conveyed along the guide path GP to the nip portion between the feed rollers 30 and the transparent plate 34.

Description of Name Card Rest 88

A name card rest 88 on which at least one name card NC will be disposed or set is arranged in the name card receiving portion 80b of the feeder housing 80. The name card rest 88 is set to be capable of advancing to or retracting from the pick-up rollers 82 and press rollers 86, that is, vertically movable in the present embodiment. The name card rest 88 is urged to move upward so as to resiliently abut against the pick-up rollers 82 and press rollers 86 by a coil spring 90 which is provided between the rest 88 and the bottom of the feeder housing 80. The name card rest 88 has a substantially inverted triangular recess 92 which is formed on the middle of the upper surface thereof, positioned between the pick-up rollers 82 and press rollers 86. A distal end of a single connecting arm 94 as a connecting means, which will be described later, is set to be capable of dropping into the recess 92.

The lower edge of the name card take-out port 80A is set to be flush with an imaginary plane connecting the lowest position of each of the pick-up rollers 82 and the lowest position of each of the press rollers 86 and the imaginary plane is set to be slant to the horizontal surface in such a manner that one end portion thereof on the downstream side with respect to the feed direction of the name card NC is lower than the other end portion thereof on the upstream side with respect to the feed direction of the name card NC.

Since the take-out port 80A is formed as described above, where a single name card NC is set on the name card rest 88, the trailing end of the single name card NC is certainly forced to be abut against the lower edge of the name card take-out port 80A, while where a plurality of name cards NC are set or stacked on the name card rest 88 as shown in FIG. 10, the trailing end of the uppermost one of the plural name cards NC is always and certainly forced to be abut against the lower edge of the name card take-out port 80A. Thus, the uppermost one of the name cards NC set on the name card rest 88, which is caused to be fed to the reader body 12 among the name cards NC upon the rotation of the pick-up rollers 82, is stably separated from the name cards which are positioned lower than the uppermost name card NC.

Description of Connecting Arm 94

The connecting arm 94 is arranged in the connecting portion 80a of the feeder housing 80 and rotatably supported to the support shaft 84 at its middle portion. The connecting arm 94 has a detecting end 94A at its right hand end in FIGS. 9 and 10 and the detecting end 94A is set to be located just above the recess 92 and capable of dropping into the recess 92. The connecting arm 94 is urged to be rotated clockwise by a torsion coil spring (not shown) which is wound around the support shaft 84.

In other words, the connecting arm 94 is urged to rotate in such a manner that the detecting end 94A is forced to be dropped into the recess 92. The detecting end 94A of the connecting arm 94 is formed to have a tapered surface so that the connecting arm 94 is easily rotatable counterclockwise by being pushed by the leading end of the name card NC, which is introduced into the feeder housing 80 through the name card set port 80B, against the urging force of the torsion coil spring.

On the other hand, the connecting arm 94 has a push end 94B at its left hand end in FIGS. 9 and 10 and the push end 94B is set to be located just above a take-out opening 80C which is formed to the bottom of the connecting portion 80a of the feeder housing 80 and capable of dropping or inserting into the housing 18 through the take-out opening 80C and the first opening 18C formed to the upper surface of the housing 18. The connecting arm 94 is urged to be rotated clockwise by a torsion coil spring (not shown) which is wound around the support shaft 84. Note that the take-out opening 80C and the first opening 18C is set to be communicating with each other when the automatic name card feeder 14 is attached to the reader body 12.

As shown in FIG. 9, the push end 94B of the connecting arm 94 is set to be positioned inside the connecting portion 80a of the feeder housing 80 where no name card NC is set on the name card rest 88, that is, the detecting end 94A of the connecting arm 94 is dropped into the recess 94 formed to the name card rest 88. Consequently, the actuate piece 50C of the detecting lever 50 is held in the non-detecting position where the detect sensor 54 is caused to be turned on.

On the other hand, as shown in FIG. 10, the push end 94B of the connecting arm 94 is set to be inserted into the housing 18 through the take-out opening 80C and the first opening 18C where at least one name card NC is set on the name card rest 88, that is, the detecting end 94A of the connecting arm 94 is retracted from the recess 94. Consequently, the actuate piece 50C of the detecting lever 50 is moved to the detecting position where the detect sensor 54 is caused to be turned off.

In the present embodiment, it is unnecessary to provide a detecting mechanism for detecting whether or not the name card NC is set on the name card rest 88 in the automatic name card feeder 14 since the presence of the name card NC on the name card rest 88 is detected by the detecting mechanism 48, which is provided in the housing 18 of the reader body 12, through the connecting arm 94. As a result, it would be possible that the size of the automatic name card feeder 14 is reduced as well as the manufacturing cost of the automatic name card feeder 14 is also lowered.

Description of Driving Force Transmitting Mechanism 96

Figure 11:
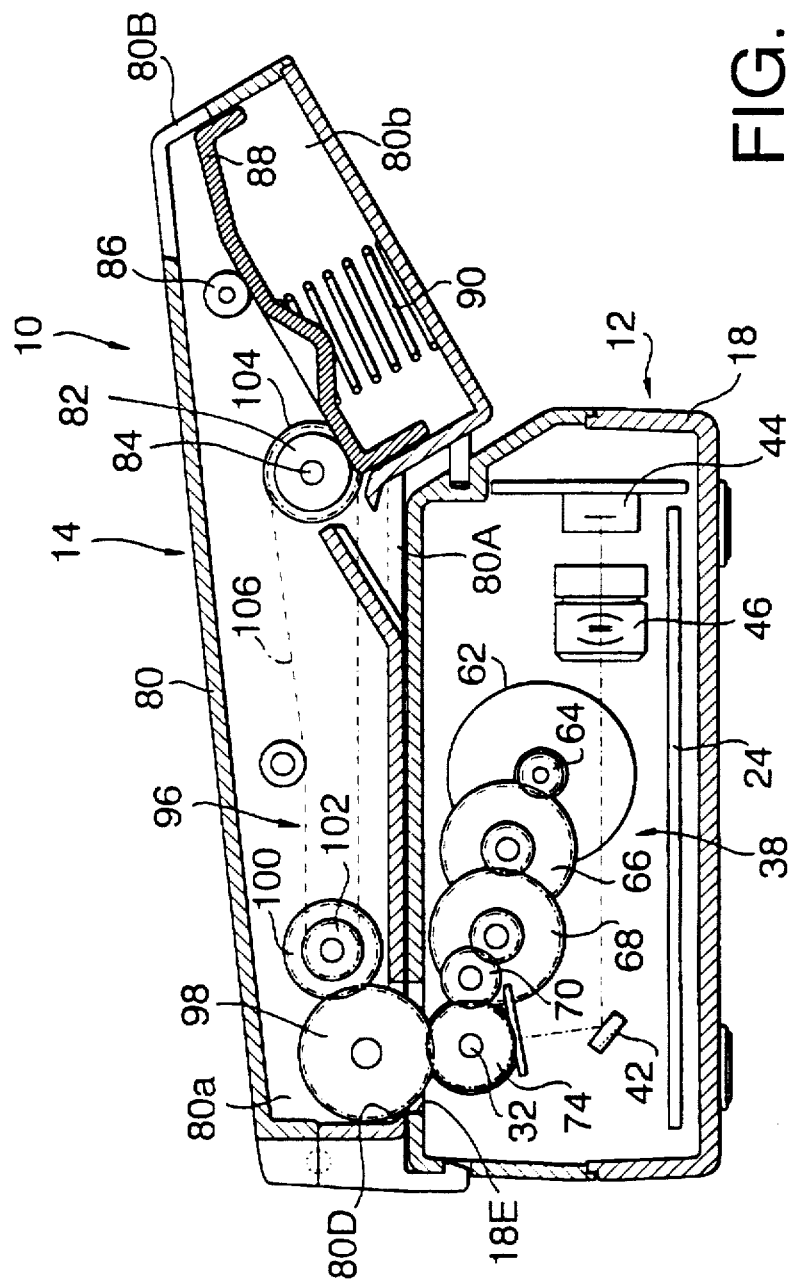
FIG. 11 is a vertically sectional view of the name card reader for showing a construction of a drive force transmitting mechanism.

With reference to FIG. 11, a driving force transmitting mechanism 96 for transmitting the drive force of the drive mechanism 38 to the support shaft 84, thereby rotating the pick-up rollers 82. That is, the automatic name card feeder 14 does not enclose a driving source therein therefore it is constructed so that the pick-up rollers 82 are rotated by the drive force of the drive mechanism 38 through the driving force transmitting mechanism 96.

The driving force transmitting mechanism 96 includes a receiving gear 98, one part of which is protruded below from the inside of the feeder housing 80 through an opening 80D formed to the bottom of the connecting portion 80a of the feeder housing 80. The receiving gear 98 is set to be meshed with the transmission gear 74 of the drive mechanism 38 in the housing 18 of the reader body 12 when the automatic name card feeder 14 is attached to the reader body 12.

The driving force transmitting mechanism 96 further includes a driven gear 100 which is provided in the feeder housing 18 and always meshing with the receiving gear 98. Coaxially fixed to the driven gear 100 is a driving pulley 102. Coaxially fixed to the support shaft 84 is a driven pulley 104. An endless belt 106 is wound between the driving pulley 102 and the driven pulley 104.

Since the drive force transmitting mechanism 96 is constructed as described above in detail, when the drive motor 62 housed in the housing 18 of the reader body 12 is initiated, the drive force of the drive motor 62 is sequentially transmitted to the transmission gear 74, the receiving gear 98 meshed with the transmission gear 74 when the automatic name card feeder 14 is attached to the reader body 12, the endless belt mechanism including the endless belt 106 and then the support shaft 84, thereby rotating the pick-up rollers 82.

As described above in detail, it is not necessary to provide a drive source for rotating the pick-up rollers or conveying the name card NC in the automatic name card feeder 14, but the feeder 14 is constructed to utilize the drive force of the drive motor 62 housed in the housing 18 of the reader body 12 through the drive force transmitting mechanism 96, in the present embodiment. Accordingly, the size of the automatic name card feeder 14 would be certainly reduced and the weight thereof would be effectively lightened as well as the cost thereof also would be effectively reduced.

Description of Attach Informing Piece 80E

As shown in FIGS. 9 and 10, an attach informing piece 80E for informing that the automatic name card feeder 14 is attached to the reader body 12 is integrally formed to the under surface of the connecting portion 80a of the feeder housing 80. The attach informing piece 80E is set to protrude downward from the under surface of the feeder housing 80 and be located in a position where it faces to the cover piece 58B of the attach detecting member 58 through the second opening 18D formed to the upper surface of the housing 18.

As a result, when the automatic name card feeder 14 is attached to the reader body 12, the attach informing piece 80E is inserted into the housing 18 of the reader body 12 through the second opening 18D and pushes down the cover piece 58B of the attach detecting member 58, thereby rotating the attach detecting member 58 counterclockwise about the support shaft 32. When the attach detecting member 58 is once rotated upon the attachment of the automatic name card feeder 14 to the reader body 12, the light reflected on the actuate piece 58C of the attach detecting member 58 is guided to the image sensor 44 and received on the second light receiving area portion 44B of the image sensor 44.

Since the attachment of the automatic name card feeder 14 to the reader body 12 is detected upon the rotation of the attach detecting member 58 due to the pushing of the attach informing piece 80E of the feeder body 80, it is possible to detect that the automatic name card feeder 14 is attached to the reader body 12 when the automatic name card feeder 14 is placed on the predetermined position on the reader body 12.

More specifically, upon the attaching operation, the receiving gear 98 is come to mesh with the transmission gear 74, the push piece 94B of the connecting arm 94 is come to push the cover piece 50B of the detecting lever 50 through the take-out opening 80C formed to the feeder housing 80 and then the first opening 18C formed to the housing 18 of the reader body 12, and the attach informing piece 80E of the feeder housing 80 is come to push the cover piece 58C of the attach detecting member 58 through the second opening 18D formed to the housing 18 of the reader body 12. Accordingly, in the present embodiment, it is unnecessary to execute an electrical connection. As a result, the attachment operation of the automatic name card feeder 14 to the reader body 12 is very simplified and operability of the attachment is advanced.

It is set that the feed rollers 30 and the pick-up rollers 82 are continuously driven to rotate when it is detected that the automatic name card reader 14 is attached to the reader body 12 through the abutment between the attach informing piece 80E and the attach detecting member 50, and at least one name card NC is stacked on the name card rest 88 through the connecting arm 94. In order to avoid to interfere the name card NC which is fed upon the rotation of the feed rollers 30 and the name card NC which is picked up upon the rotation of the pick-up rollers 82, or in order to separate the name card NC which is fed upon the rotation of the feed rollers 30 from the name card NC which is picked up upon the rotation of the pick-up rollers 82, the feed speed FS of the name card NC which is fed by the rotation of the feed rollers 30 is set to be faster than the pick-up speed PS of the name card NC which is picked up by the rotation of the pick-up rollers 82.

As a result, even though the name cards NC stacked on the name card rest 88 are picked up one after another and conveyed to the feed rollers 30 upon the continuous rotation of the pick-up rollers 82, the leading edge of the name card NC picked up by the pick-up rollers 82 is separated from the trailing edge of the name card NC fed by the feed rollers 30 while the name card NC fed by the feed rollers 30 is passing over the transparent plate 34 and subjected to the reading operation. Accordingly, it is certainly prevented from reading the image impressions of both of the name cards NC which are picked up by the pick-up rollers 82 and the feed rollers 30, respectively, at one time.

Furthermore, a distance between the feed rollers 30 and the pick-up rollers 82 along the feed path of the name card NC is set to be shorter than a length of the name card NC with the minimum size along the feed path. For example in the present embodiment, the length of the name card NC with the minimum size along the feed path is set to 5 mm while the distance between the feed rollers 30 and the pick-up rollers 82 along the feed path is set to be 82 mm. As a result, the name card with an arbitrary size which is picked up by the pick-up rollers 82 is stably conveyed to the nip portion between the feed rollers 30 and the transparent plate 34 upon the rotation of the pick-up rollers 82 and then fed to the discharge port 18B of the housing 18 upon the rotation of the feed rollers 30.

[Description of Control Procedure of Control Unit]

Hereinafter, the description will be given to the control procedure of the control unit, with reference to FIGS. 12 and 13.

As shown in the flow-chart in FIG. 12, when the power switch (not shown) is turned on, the control operation in the control unit is started to execute as described below in detail. As first, it is determined that whether or not the detect sensor 54 is turned on (step S10). When it is determined that the detect sensor 54 is turned on (that is, YES in step S10), it means that the name card NC has not yet been manually inserted into the housing 18 through the take-in port 18A in a condition where the name card reader 10 is constructed only by the reader body 12 (without the automatic name card feeder 14), while it means that no name card NC has been stacked on the name card rest 88 in the automatic name card feeder 14 in a condition where the name card reader 10 is constructed by the reader body 12 and the automatic name card feeder 14. In this situation, the control unit waits that the detect sensor 54 will be turned off.

When it is determined that the detect sensor 54 is turned off (that is, NO in step S10), it means that the name card NC is manually inserted into the housing 18 through the take-in port 18A in the condition where the name card reader 10 is constructed only by the reader body 12, while it means that at least one name card NC is stacked on the name card rest 88 in the automatic name card feeder 14 in the condition where the name card reader 10 is constructed by the reader body 12 and the automatic name card feeder 14. In this situation, the control unit controls to start to lighten the array 28 of the LEDs (step S12) as well as to drive the drive motor 62 (step S14).

Consequently, the name card NC, which is manually inserted into the housing 18, is fed to the discharge port 18B upon the rotation of the feed rollers 30 where the name card reader 10 is constructed only by the reader body 12. On the other hand, the name card NC, which is stacked on the name card rest 88, is picked up and conveyed to the nip portion between the feed rollers 30 and the transparent upon the rotation of the pick-up rollers 82 and the name card NC, the leading end of which is clumped between the nip portion, is fed to the discharge port 18B upon the rotation of the feed rollers 30 where the name card reader 10 constructed by the reader body 12 and the automatic name card feeder 14.

Thereafter, the control unit waits that the light reflected by the leading edge of the name card NC is to be received on the first light receiving area portion 44A of the image sensor 44 and the image signal is to be output therefrom (that is, NO in step S16), and continues the steps S 12 and S14, repeatedly, until the leading edge of the name card NC will be detected by the image sensor 44. When the leading edge of the name card NC is detected by the image sensor 44 (that is, YES in step S16), the control unit starts to execute the reading operation of the image impression of the name card NC (step S18). Namely, the control unit reads out the image impression of the name card NC based on the detected signal from the image sensor 44, and stores the detected results (that is, the detected image impression of the name card NC) in a memory device (not shown) through an output port (not shown) as well as controls to display the detected results in a display device (not shown).

Then, the control unit waits that the trailing edge of the name card NC, which is subjected to be read the image impression thereof, is to be detected by the image sensor 44 (that is, NO in step S20) until the trailing edge of the name card NC will be detected by the image sensor 44. When the trailing edge of the name card NC is detected by the image sensor 44 (that is, YES in step S20), it means that the image reading operation for the name card NC now being fed has been completed, therefore, it is determined that whether or not the detect sensor 54 is turned on (step S22). When it is determined that the detect sensor 54 is turned off (that is, NO in step S22), it means that the next name card NC is now picked up and conveyed to the nip portion of the feed rollers 30 and the transparent plate 34 upon the rotation of the pick-up rollers 82, being followed to the name card NC which has been read its image impression thereof. Accordingly, the control procedure of the control unit is returned to the step S12 in order to execute the image read operation for the next name card and repeats the control steps from the step S12.

On the other hand, when it is determined that the detect sensor 54 is turned on (that is, it is detected that the step S22 is YES), it is assumed that the name card NC which has been subjected the image read operation is final. However, if the size of the name card NC which has been subjected the image read operation is set to be minimum as shown in FIG. 13, it will occur that the leading edge of the name card NC with minimum size does not push the detected piece 50A of the detect lever 50 and the trailing edge of the name card NC with the minimum size does not engage with the detecting end 94A of the connecting arm 94.

In this condition, the detected piece 50A of the detect lever 50 is dropped into the recess 40 and thereby causing the detect sensor 54 be turned on, while the detecting end 94a of the connecting arm 94 is dropped into the recess 92 and thereby also causing the detect sensor 54 be turned on. Accordingly, as shown in FIG. 13, even though the final name card NC is surely remained on the guide path GP, the control unit erroneously detects that there is no name card NC on the guide path GP and controls to stop the image reading operation as well as to stop the drive of the drive mechanism 38, whereby the last name card NC will be improperly remained on the guide path GP.

In the present embodiment, however, even though it is determined that the detect sensor 54 is turned on in the step S22, and it is assumed that the name card NC which has been subjected the image reading operation is final, the control unit continues to drive the drive motor 62 by a predetermined amount or time (step S24). After the further drive of the drive motor 62 in the step S24, it is determined that whether or not the detect sensor 54 is turned on (step S26). When it is determined that the detect sensor 54 is turned off (that is, NO in the step S26), it means that the last or final name card NC is really remained on the guide path GP. Thus, the control procedure of the control unit is returned to the step S12 in order to execute the image read operation for the final name card and repeats the control steps from the step S12.

As described above, even though it is assumed that the name card with the minimum size, to which the image reading operation has been completed at a time when it is determined YES in the step S22, is really not final but is erroneously recognized as the final one, the drive motor 62 is further rotated by the prescribed amount or time in the step S24. Accordingly, the really final name card NC which has been remained on the guide path GP will be certainly conveyed to the nip portion between the feed rollers 30 and the transparent plate 34 and then be subjected the image reading operation.

On the other hand, when it is determined that the detect sensor 54 has been turned on after the drive motor 62 is further driven to rotate by the predetermined amount or time(that is, YES in the step S26), it means that there is no name card NC on the guide path GP and it is decided that the name card with the minimum size, to which the image reading operation has been completed at the time when it is determined YES in the step S22, is correctly final. Accordingly, the control unit controls to drive the drive motor 62 to further rotate in a predetermined amount or time (step S28), thereby discharging the final name card NC from the discharge port 18B, and then turned off the array 28 of the LEDs (step S30).

As described above in detail in the present embodiment, a series of the control procedure is completed, the control unit waits for the next turn-on operation of the detect sensor 54.

[Description of Other Embodiment and Modification]

The present invention is not limited to the construction of the present embodiment and may be modify without departing from the spirit or scope of the present invention.

In the aforementioned embodiment, the image reader according to the present invention is applied to the name card reader 10 in the present embodiment. However, the present invention is not limited such an application but the present invention may be applicable to an image reader in which an image impression of a document or an original without the name card is read.

Also in the aforementioned embodiment, the automatic name card feeder 14 is optionally attached to the reader body 12, as an option unit in the present embodiment. However, the present invention is not limited to such an option unit, but the other equipment which has a function other than the automatic feeding function may be optionally attached to the reader body 12.

Figure 12:
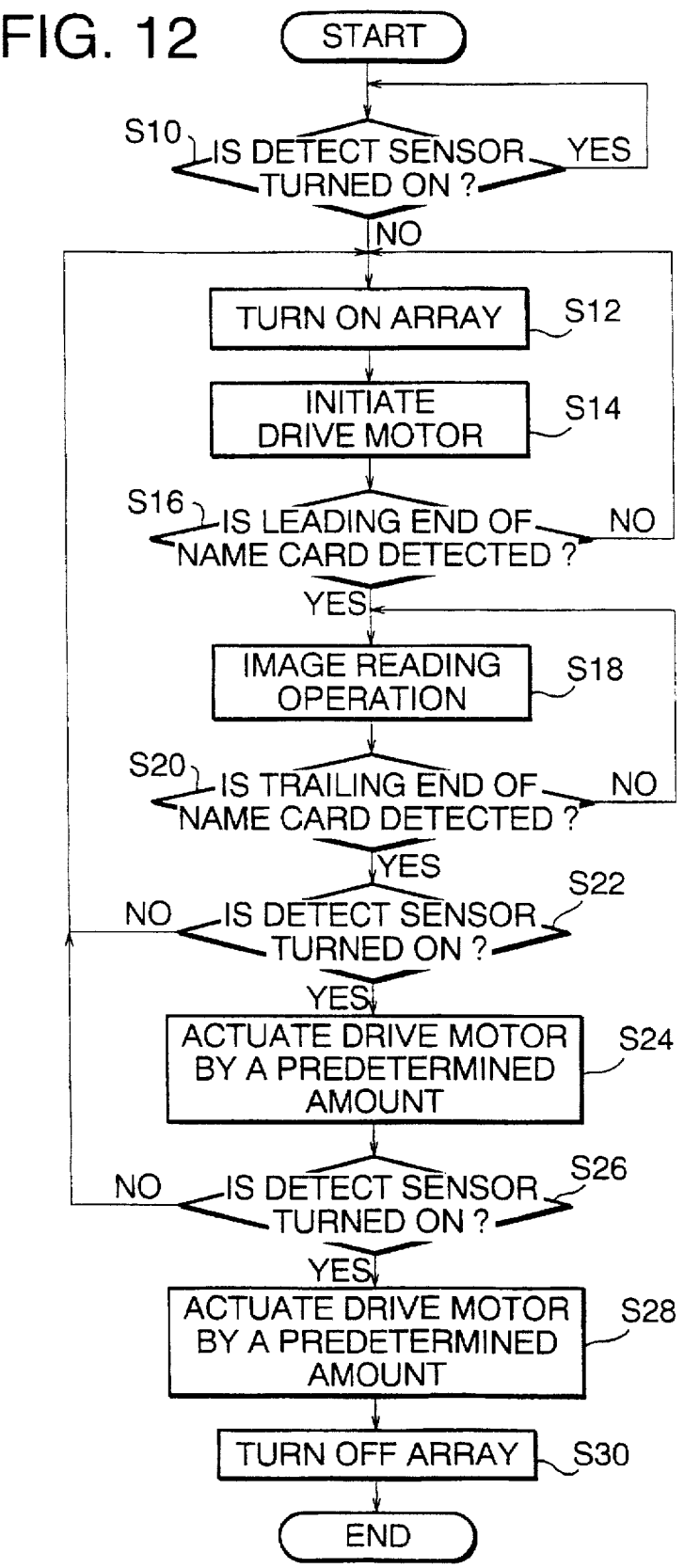
FIG. 12 is a flow-chart showing a control procedure of a control unit.

Additionally, in the aforementioned embodiment, the control unit executes the control procedure as shown in FIG. 12. However, the present invention is not limited to execute such a control procedure of the control unit but may execute a control procedure according to one modification of the present embodiment, as shown in FIG. 14. In the following description of the modification, the same step shown in FIG. 12 will be used to a step shown in FIG. 14 with the same number.

As shown in FIG. 14, when it is determined to YES in the step S20, that is, the trailing end of the name card NC is detected by image sensor 44, it is determined that whether or not a flag F for indicating that the name card NC, the trailing end of which is detected by the image sensor 44, is final is set to "1" (step S21). When it is determined that the flag F is reset to "0", that is, the name card NC, the trailing end of which is detected by the image sensor 44, is not final (that is, NO in the step S21), the control procedure proceeds to the step S22 as in the above-mentioned embodiment and it is determined that whether or not the detect sensor 54 is turned on.

On the other hand, where it is determined to NO in the step S26, that is, the detect sensor 54 is turned off, it can be decided that the name card NC is final because the drive motor 62 has already been driven by the predetermined amount or time in the step S24. Accordingly, the flag F is set to "1" for indicating that the name card NC is final (step S27), and the control procedure is returned to the step S12 and repeats the control steps from the step S12.

Where it is determined to YES in the step S21, that is, the flag F has already been set to "1" when the trailing end of the name card NC is detected by the image sensor 44, it can be decided that the name card NC, the trailing end of which is detected by the image sensor 44, is final. Accordingly, the flag F is reset to "0" (step S23), and then the control procedure proceeds to the step S28 and repeats the control steps form the step S28.

More specifically in the present modification, the name card NC which is determined to NO in the step 26 can be decided to be final, accordingly, it is not necessary to execute the control steps of S22 through S26 after the image reading operation of the name card NC has been completed. Thus, the control steps of S22 through S26 could be skipped out and the steps S28 and S30 can be directly executed, thereby stopping the drive of the drive motor 62 and turning off the array 28 of the LEDs.

As described in detail in the present modification, the time necessary to execute the image reading operation for the final name card NC would be shortened and the name card reader which is improved the operability would be improved.

Further, in the aforementioned embodiment, the connecting means includes a single connecting arm 94. However, the present invention is not limited such a construction, but may include a link mechanism having a plurality of arms.

Still further, in the aforementioned embodiment, the attachment of the name card feeder 14 to the reader body 12 is detected when the attach inform piece 80E formed to the feeder housing 80 of the name card feeder 14 pushes the attach detect member 58, thereby changing or raising the level of the light which is reflected by the attach detect member 58 and received on the second light receiving area portion 44B of the image sensor 44.

However, the present invention is not limited to such a construction but the attachment of the name card feeder 14 to the reader body 12 may be detected without using the attach inform piece 80E and the attach detect member 58, but detected by using an information indicate member which is not shown but indicates the attachment of the automatic name card feeder 14 to the reader body 12 by, for example, a bar code and is fixed to the bottom of the feeder housing 80 at a position where the light from the array 28 of the LEDs is to be reflected thereon and the control unit is constructed in such a manner that it detects that the automatic name card feeder 14 is attached to the reader body 14 based on a detected signal which is output from the image sensor 44 upon receiving of the light reflected on the information indicate member thereto.

By using the information indicate member for detecting the attachment of the automatic name card feeder 14 to the reader body 12, it could be detected that an option device other than the automatic name card feeder 14 is attached to the reader body 12 by changing an information which is indicated by the information indicate member.

As the present invention may be embodied in several forms without departing from the spirit of essential characteristics thereof, the present embodiment is therefore illustrative and not restrictive, since the scope of the present invention is defined by the appended claims rather than by the description preceding them, and all changes that fall within meets and bounds of the claims, or equivalence of such meets and bounds are therefore intended to embraced by the claims.

What is claimed is:

1. An image reader which comprises:
    a reader body having an image reading function for reading an image impression formed on an original; and
    an automatic original feeder detachably attached to said reader body for automatically feeding the originals to said reader body one by one,
    said reader body including:
        illumination means for illuminating said original fed by said automatic original feeder;
        an image sensor including a light receiving area having a first light receiving area portion and second light receiving area portion, for receiving a light, which is illuminated by said illumination means and reflected on said original, on said first light receiving area portion and outputting a detect signal with an image information;
        an attach detect member movable between an attach detect position where the light illuminated by said illumination means and reflected thereon is set to be received on said second light receiving area portion and a detach detect position where the light illuminated by said illumination means and reflected thereon to outside of said image sensor, wherein said attach detect member is urged by an urging member from said attach detect position to said detach detect position;
        a housing with an opening, one end portion of said attach detect member being set to close said opening when said attach detect member is in said detach detect position; and
    said automatic original feeder includes a feeder housing and an attach information member fixed to said feeder housing, said attach information member moving said attach detect member from the detach detect position to the attach detect position upon the attachment of said automatic original feeder to said reader body;
    wherein said attach information member is set to contact said one end portion of the attach detect member through said opening and move the attach detect member from the detach detect position to the attach detect position against the urging force of said urging member.

2. The image reader according to claim 1, wherein
    said reader body includes detect means for outputting a detect signal upon the insertion of said original therein, and
    said automatic original feeder includes connect means which is mechanically connected to said detect means when said automatic original feeder is attached to said reader body and causes the detect means to output said detect signal upon the set of the original on said set surface of said automatic original feeder.

3. The image reader according to claim 2, wherein
    said detect means includes:
        a detect lever retractable from a guide path along which said original is fed and retracted from said guide path by said original fed from said automatic original feeder, and
        a detect sensor for outputting a detect signal corresponding to the retracting movement of said detect lever.

4. The image reader according to claim 3, wherein
    said detect lever is urged to a position crossing said guide path by an urging member and moved from said position to the retracted position by the original, which is fed by said automatic original feeder, against the urging force of said urging member.

5. The image reader according to claim 3, wherein
    said reader body includes a housing with an opening, and
    one end portion of said detect lever is set to close said opening where said detect lever is positioned to said position crossing said guide path.

6. The image reader according to claim 5, wherein
    said connect means includes a connect arm one end of which is retractably located in a position passing across a set surface of said original and retracted from said position by the original set on said set surface in said automatic original feeder.

7. The image reader according to claim 6, wherein said automatic original feeder includes a feeder housing with an opening, and another end of the connect arm is located in said feeder housing where said one end thereof passes across said set surface, while said another end of the connect arm is protruded to the outside of said feeder housing through said opening where said one end of the connect arm is retracted from said position passing across the set surface.

8. The image reader according to claim 7, wherein said opening formed to said feeder housing is set to communicate with said opening formed to said housing of said reader body when said automatic original feeder has been attached to said reader body.

9. The image reader according to claim 8, wherein said other end of the connect arm is set to contact one end of said detect lever through said opening formed to said feeder housing and said opening formed to said housing of said reader body and move the detect lever to cause the detect means to output the detect signal when said one end of the connect arm is retracted from said position passing across the set surface.

10. An image reader which comprises:

a reader body having an image reading function for reading an image impression formed on an original; and an automatic original feeder detachably attached to said reader body for automatically feeding the originals to said reader body one by one, said reader body including:
    illumination means for illuminating said original fed by said automatic original feeder;
    an image sensor including a light receiving area having a first light receiving area portion and second light receiving area portion, for receiving a light, which is illuminated by said illumination means and reflected on said original, on said first light receiving area portion and outputting a detect signal with an image information;
    an attach detect member movable between an attach detect position where the light illuminated by said illumination means and reflected thereon is set to be received on said second light receiving area portion and a detach detect position where the light illuminated by said illumination means and reflected thereon to outside of said image sensor, said automatic original feeder includes a feeder housing and an attach information member fixed to said feeder housing, said attach information member moving said attach detect member from the detach detect position to the attach detect position upon the attachment of said automatic original feeder to said reader body and detect means for detecting that the original has been fed from the automatic original feeder, and said automatic original feeder includes connect means which is mechanically connected to said detect means when said automatic original feeder is attached to said reader body and causes the detect means to detect that at least one original is set to said automatic original feeder wherein said detect means includes:

a detect lever retractable from a guide path along which said original is fed and retracted from said guide path by said original fed from said automatic original feeder, and a detect sensor for outputting a detect signal corresponding to the retracting movement of said detect lever.

11. The image reader according to claim 10, wherein said detect lever is urged to a position crossing said guide path by an urging member and moved from said position to the retracted position by the original, which is fed by said automatic original feeder, against the urging force of said urging member.

12. The image reader according to claim 10, wherein said reader body includes a housing with an opening, and one end portion of said detect lever is set to close said opening where said detect lever is positioned to said position crossing said guide path.

13. The image reader according to claim 12, wherein said connect means includes a connect arm one end of which is retractably located in a position passing across a set surface of said original and retracted from said position by the original set on said set surface in said automatic original feeder.

14. The image reader according to claim 13, wherein said automatic original feeder includes a feeder housing with an opening, and another end of the connect arm is located in said feeder housing where said one end thereof passes across said set surface, while said another end of the connect arm is protruded to the outside of said feeder housing through said opening where said one end of the connect arm is retracted from said position passing across the set surface.

15. The image reader according to claim 14, wherein said opening formed to said feeder housing is set to communicate with said opening formed to said housing of said reader body when said automatic original feeder has been attached to said reader body.

16. The image reader according to claim 15, wherein said other end of the connect arm is set to contact one end of said detect lever through said opening formed to said feeder housing and said opening formed to said housing of said reader body and move the detect lever to cause the detect means to detect when said one end of the connect arm is retracted from said position passing across the set surface.

17. The image reader according to claim 1 which further comprises:

pick-up means arranged in said automatic original feeder, for picking up the original set on a set surface, one by one;

feed means arranged in said reader body, for feeding the original which has been conveyed from said automatic original feeder;

first detect means for detecting that at least one original is set on said set surface in said automatic original feeder;

second detect means for detecting that the original is conveyed into said reader body; and control means for controlling to drive said pick-up means and said feed means when said first detect means detects that at least one original is set on said set surface in said automatic original feeder, while to drive said pick-up means and said feed means by a predetermined time when said first detect means does not detect that at least one original is set on said set surface in said automatic original feeder and said second detect means does not detect that the original is conveyed into said reader body where all of said originals have been sequentially read out and a final original has been set on said set surface.

18. The image reader according to claim 17, wherein said control means controls to stop the image reading operation because the original which has been fed from the automatic original feeder is a final original where said second detect means does not detect that the original is conveyed into said reader body after said pick-up means and said feed means have been driven by said predetermined time.

19. The image reader according to claim 18, wherein said control means controls to stop the image reading operation as well as to drive said feed means by a second predetermined time to discharge the original, which is determined to be final, to outside of said reader body.

20. The image reader according to claim 18, wherein said control means controls to execute the image reading operation because the original which has been fed from the automatic original feeder is not a final original where said second detect means detects that the original is conveyed into said reader body after said pick-up means and said feed means have been driven by said predetermined time.

21. The image reader according to claim 20, wherein said control means controls to drive said feed means by a predetermined time to discharge the final original from the reader body where the final original has been subjected to the image reading operation even though said first and second detect means do not detect.

22. The image reader according to claim 17, wherein said automatic original feeder is optionally attached to said reader body.

23. The image reader according to claim 17, wherein said first and second detect means are mechanically connected by connect means to each other and includes a common detect sensor.

24. The image reader according to claim 23, wherein said common detect sensor is arranged in said reader body.

25. The image reader according to claim 24, wherein said common detect sensor outputs a detect signal when the second detect means detects that the original is conveyed from said automatic original feeder, and the sensor outputs a detect signal when the first detect means detects that the original is set on said set surface in said automatic original feeder, through said connect means.

26. The image reader according to claim 25, wherein said common detect sensor outputs the same detect signal when said first detect means detects and said second detect means detects.

* * * * *